United States Patent
Paltashev et al.

(10) Patent No.: US 10,593,111 B2
(45) Date of Patent: *Mar. 17, 2020

(54) METHOD AND APPARATUS FOR PERFORMING HIGH THROUGHPUT TESSELLATION

(71) Applicant: Advanced Micro Devices, Inc., Santa Clara, CA (US)

(72) Inventors: Timour T. Paltashev, Santa Clara, CA (US); Boris Prokopenko, Santa Clara, CA (US); Vladimir V. Kibardin, Palo Alto, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/057,212

(22) Filed: Aug. 7, 2018

(65) Prior Publication Data
US 2018/0342099 A1 Nov. 29, 2018

Related U.S. Application Data

(63) Continuation of application No. 14/984,896, filed on Dec. 30, 2015, now Pat. No. 10,068,372.

(51) Int. Cl.
*G06T 17/20* (2006.01)
*G06T 15/00* (2011.01)
*G06T 1/20* (2006.01)

(52) U.S. Cl.
CPC .............. *G06T 17/20* (2013.01); *G06T 1/20* (2013.01); *G06T 15/005* (2013.01); *G06T 2210/52* (2013.01)

(58) Field of Classification Search
None
See application file for complete search history.

(56) References Cited

U.S. PATENT DOCUMENTS

| | | |
|---|---|---|
| 5,457,600 A | 10/1995 | Campbell et al. |
| 6,057,848 A | 5/2000 | Goel |
| 6,100,894 A | 8/2000 | Goel |
| 6,211,883 B1 | 4/2001 | Goel et al. |
| 6,597,356 B1 | 7/2003 | Moreton et al. |
| 6,906,716 B2 | 6/2005 | Moreton et al. |
| 7,233,328 B2 | 6/2007 | Christensen et al. |
| 7,746,342 B2 | 6/2010 | Yamada |
| 7,903,112 B2 | 3/2011 | Yamada |
| 7,928,979 B2 | 4/2011 | Patel et al. |
| 8,120,607 B1 | 2/2012 | Legakis et al. |

(Continued)

OTHER PUBLICATIONS

Fatahalian, Kayvon, "Evolving the Direct3D Pipeline for Real-Time Micropolygon Rendering", Beyond Programmable Shading Course, Jul. 20, 2010, 62 pages, ACM SIGGRAPH 2010, Stanford University, available at: http://bps10.idav.ucdavis.edu/talks/10-fatahalian_MicropolygonsRealTime_BPS_SIGGRAPH2010.pdf.

(Continued)

*Primary Examiner* — Nicholas R Wilson
(74) *Attorney, Agent, or Firm* — Volpe and Koenig, P.C.

(57) ABSTRACT

A method, a system, and a computer-readable storage medium directed to performing high-speed parallel tessellation of 3D surface patches are disclosed. The method includes generating a plurality of primitives in parallel. Each primitive in the plurality is generated by a sequence of functional blocks, in which each sequence acts independently of all the other sequences.

20 Claims, 7 Drawing Sheets

(56) References Cited

U.S. PATENT DOCUMENTS

| | | |
|---|---|---|
| 8,289,323 B2 | 10/2012 | Yamada |
| 8,471,852 B1 | 6/2013 | Bunnell |
| 8,482,560 B2 | 7/2013 | Sathe et al. |
| 8,599,202 B1 | 12/2013 | Legakis et al. |
| 8,605,085 B1 | 12/2013 | Moreton |
| 2004/0085313 A1 | 5/2004 | Moreton et al. |
| 2005/0179686 A1 | 8/2005 | Christensen et al. |
| 2006/0197760 A1 | 9/2006 | Yamada |
| 2009/0237400 A1 | 9/2009 | Patel et al. |
| 2010/0079454 A1 | 4/2010 | Legakis et al. |
| 2010/0164955 A1 | 7/2010 | Sathe et al. |
| 2010/0214295 A1 | 8/2010 | Yamada |
| 2011/0080405 A1 | 4/2011 | Moreton et al. |
| 2011/0109625 A1 | 5/2011 | Yamada |
| 2011/0148877 A1 | 6/2011 | Patel et al. |
| 2012/0229464 A1 | 9/2012 | Fishwick |
| 2014/0152675 A1 | 6/2014 | Martin et al. |

OTHER PUBLICATIONS

Nvidia Corporation, "DirectX 11 Tesselation", available at: http://www.nvidia.com/object/tessellation.html, 2015 (Retrieved Dec. 30, 2015).

Microsoft Corporation, "Tesselation Overview", available at: https://technet.microsoft.com/en-us/forefront/ff476340%28v=vs.105%29, 2015 (Retrieved Dec. 30, 2015).

Microsoft Corporation, "Direct3D 11 Tesselation", Presentation from Microsoft Game Technology Conference GameFest 2008, Jul. 22, 2008, 41 pages, available at: http://www.microsoft.com/en-us/download/details.aspx?id=23111 (Retrieved Dec. 30, 2015).

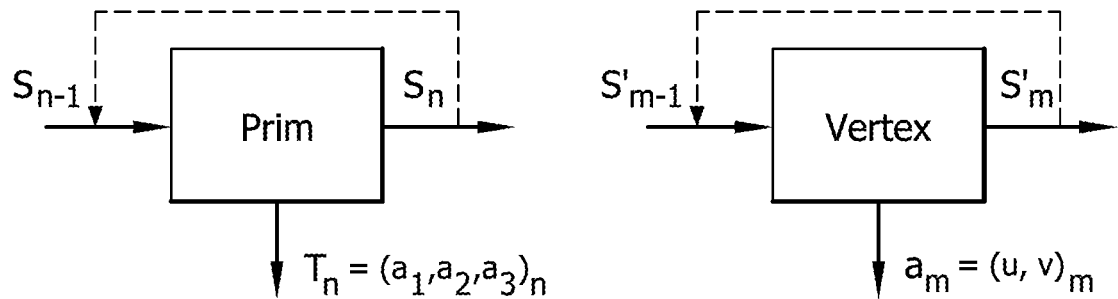
FIG. 2a
(Prior Art)
FIG. 2b
(Prior Art)
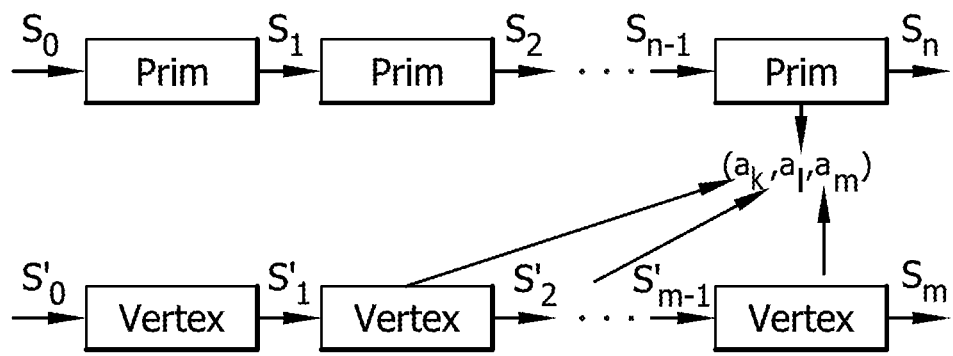
FIG. 2c
(Prior Art)

METHOD AND APPARATUS FOR PERFORMING HIGH THROUGHPUT TESSELLATION

CROSS REFERENCE TO RELATED APPLICATION

This application is a continuation of U.S. patent application Ser. No. 14/984,896, filed Dec. 30, 2015, which is incorporated by reference as if fully set forth.

FIELD OF THE INVENTION

The present invention is generally directed to a tessellation operation, and more particularly to performing a high throughput tessellation in 3D computer graphics systems.

BACKGROUND

The rendering of images in computer graphics has become increasingly more realistic with the onset of three-dimensional (3D) scenes. In some graphics applications, such as computer gaming, the level of detail (LOD) of a 3D object may not need to be the same depending on how far away the object is to be viewed. For example, an object farther away relative to the observer need not have the same LOD as the same object when viewed close-up. One way to render 3D detailed surfaces realistically with different LODs is through the use of tessellation. In tessellation, a 3D surface may be divided into surface patches. Surface patches may, in turn, be broken up into primitives for rendering in graphics hardware. By breaking up the 3D surfaces into surface patches and primitives, the same 3D objects can be rendered in greater detail as necessary. Another goal of using 3D surface patches with following on-chip tessellation is to reduce the amount of information and information transfer and processing needed to render smooth surfaces in graphics processors. Meshes based on quadrilateral primitives or triangle primitives may be considered as representations for 3D objects. 3D surface patches may be considered as a compressed representation of this quadrilateral mesh or triangle mesh with a ratio of compression that may range between 10 and 100, depending on required level of detail. In this point of view, each 3D surface patch in a scene object model needs to be decompressed to a quadrilateral mesh or triangle mesh in order to be processed by a rendering pipeline. Such decompression may be referred to as a tessellation stage, and the processing rate of this stage may determine overall 3D rendering performance in graphics systems.

FIG. 1 shows an existing graphics pipeline 10 that includes tessellation. Input assembler (IA) 20 reads vertices out of a buffer 15 using fixed function operations, forming mesh geometry, and creating pipeline work items. Input assembler 20 also generates identifiers, or indices (IDs) for work items. These IDs are to be used for ID-specific processing by other components of pipeline 10, such as vertex shader 25, hull shader 30, domain shader 40, geometry shader 45, and pixel shader 55, as indicated by the dashed lines on the right of FIG. 1.

Vertex shader (VS) 25 outputs one vertex for each one vertex it receives from IA 20. Hull shader (HS) 30 operates on each vertex from VS 25 in two phases. In control point phase, HS 30 outputs one control point per invocation. Its aggregate output is shared as input to both tessellator (TS) 35 and domain shader (DS) 40. In patch constant phase, which is invoked once per patch, HS 30 reads input of all input and output control points and patch constants computed so far. HS 30 outputs edge tessellation factors and other patch constant data.

Tessellator (TS) 35 receives numbers called tessellation factors (TFs) from HS 30 defining how much to tessellate. TS 35 generates domain locations and topology. For example, such tessellation factors may specify how many times a patch is subdivided on each side and in an internal area as well. As non-limiting examples, triangle patches, may have four TFs: three for sides and one for interior, while quadrilateral patches may have six TFs: one for each side and two for the interior. These factors may be fixed or adaptive based on software settings.

Domain shader (DS) 40 inputs one domain location plus shared read-only input of all HS outputs for the patch. DS 40 outputs one vertex.

Geometry shader (GS) 45 inputs one primitive and outputs up to four streams, each independently receiving no primitives or some primitives. As shown, an output stream from GS 45 can provide primitives to rasterizer (RS) 50 while, or alternatively, up to four streams can be concatenated to memory-based buffer 15.

Rasterizer (RS) 50 further prepares data for further pixel processing. RS 50 performs functions of clipping including custom clip boundaries, perspective divide, viewport/scissor selection and implementation, RenderTarget selection, and primitive setup. RenderTarget is a type of displayable frame buffer or any memory surface with pixels addressed via geometry coordinates instead of linear addressing.

Pixel shader (PS) 55 inputs one pixel for processing and outputs either one pixel at the same RenderTarget position or no pixel.

Output merger (OM) 60 provides fixed function Render-Target blend/depth/stencil operations.

FIGS. 2a, 2b and 2c show an existing iterative tessellation method used in graphics processing units (GPU). FIG. 2a shows a tessellation block that generates primitives iteratively one by one in a pipeline such as that shown in FIG. 1. Being iterative, it takes a previous state $S_{n-1}$ (e.g. indices of a previous primitive or some other data), produces a new state $S_n$ and outputs a primitive $T_n$ consisting of a set of vertices $(a_1, a_2, a_3)_n$. In this expression, $a_1$, $a_2$ and $a_3$ are integer indices of vertices used for enumeration of vertex flow items. In FIG. 2b, a vertex generating block is shown. Similarly to the primitive generator block, it reads an old state $S'_{m-1}$ and produces the new state $S'_m$ along with a vertex $a_m$ represented as a set of coordinates $(u,v)_m$. FIG. 2c shows a set of steps necessary to produce a single primitive represented as a set of coordinates. Primitive and vertex generators have to go through n and m iterations respectively. Furthermore, the vertex generators and primitive generators must interact with each other. For example, as shown in FIG. 2c, they depend on each other through the set of shared vertices $(a_k, a_l, a_m)$. This creates a dependency that prevents a fully parallel execution.

The existing tessellation solution described above includes some deficiencies which lead to poor tessellation performance, especially with small size primitives (such as quadrilaterals or triangles) in pixel or sub-pixel level subdivision when an output pixel rate is significantly reduced, possibly becoming less than or equal to a primitive rate. Pixel rate may become even lower than primitive rate when subdivision size becomes comparable to, or smaller than, a size of a single pixel. A primitive rate is normally a few times lower than output pixel rate, especially in the case of primitives of larger sizes with several pixels covered. In addition, the use of an iterative tessellation procedure adds another limitation on primitive rate, which results in additional adverse effects on pixel rate.

It may therefore be beneficial to provide a method and apparatus of tessellation to generate a larger amount of pixels and sustain a high pixel rate in case of pixel or subpixel size subdivision.

SUMMARY

A method, a system, and a computer-readable storage medium directed to performing high-speed parallel tessellation of 3D surface patches are disclosed. The method includes generating a plurality of primitives in parallel. Each primitive in the plurality is generated by a sequence of functional blocks, in which each sequence acts independently of all the other sequences.

BRIEF DESCRIPTION OF THE DRAWINGS

A more detailed understanding may be had from the following description, given by way of example in conjunction with the accompanying drawings wherein:

FIGS. 2a, 2b, and 2c show an existing tessellation flow implementation;

DETAILED DESCRIPTION OF THE EMBODIMENTS

Although a more detailed description of the embodiments is provided below, briefly a method and apparatus for performing high throughput tessellation is disclosed. The method may generate enough pixels to sustain a relatively high pixel rate when sizes of subdivisions are so small as to be similar to, or less than, sizes of pixels. A graphics pipeline is also modified to read patch data directly into a pixel shader, which may avoid extra traffic generated by existing methods. In addition, attribute evaluation may be performed by a pixel shader instead of a domain shader, and may be deferred until pixels are visible. Accordingly, higher pixel rates for fine-grain subdivision surfaces may be sustained, limited only by the computational power of the graphics pipeline.

Figure 1:
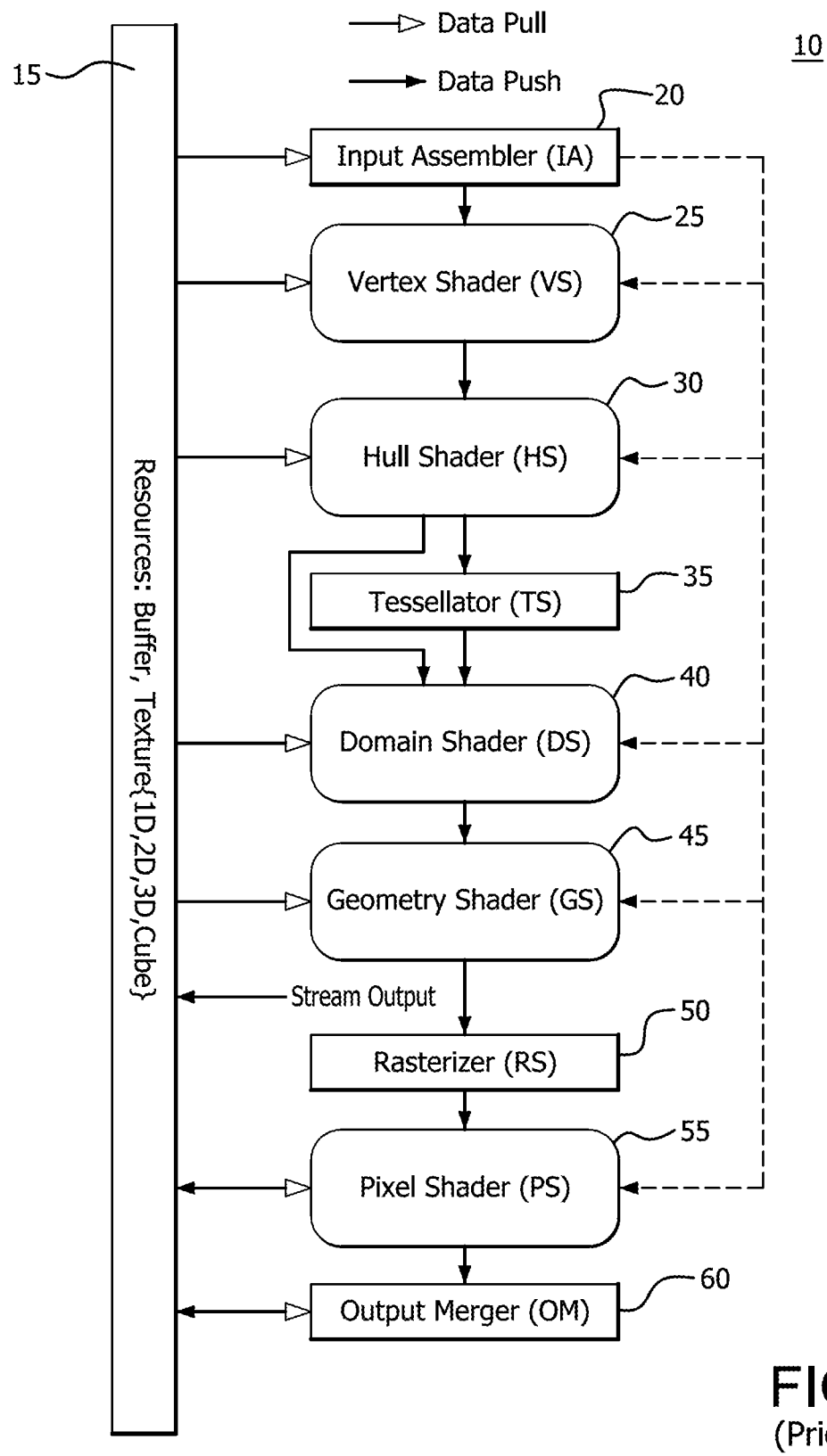
FIG. 1 shows an example of an existing graphics pipeline.
Figure 3:
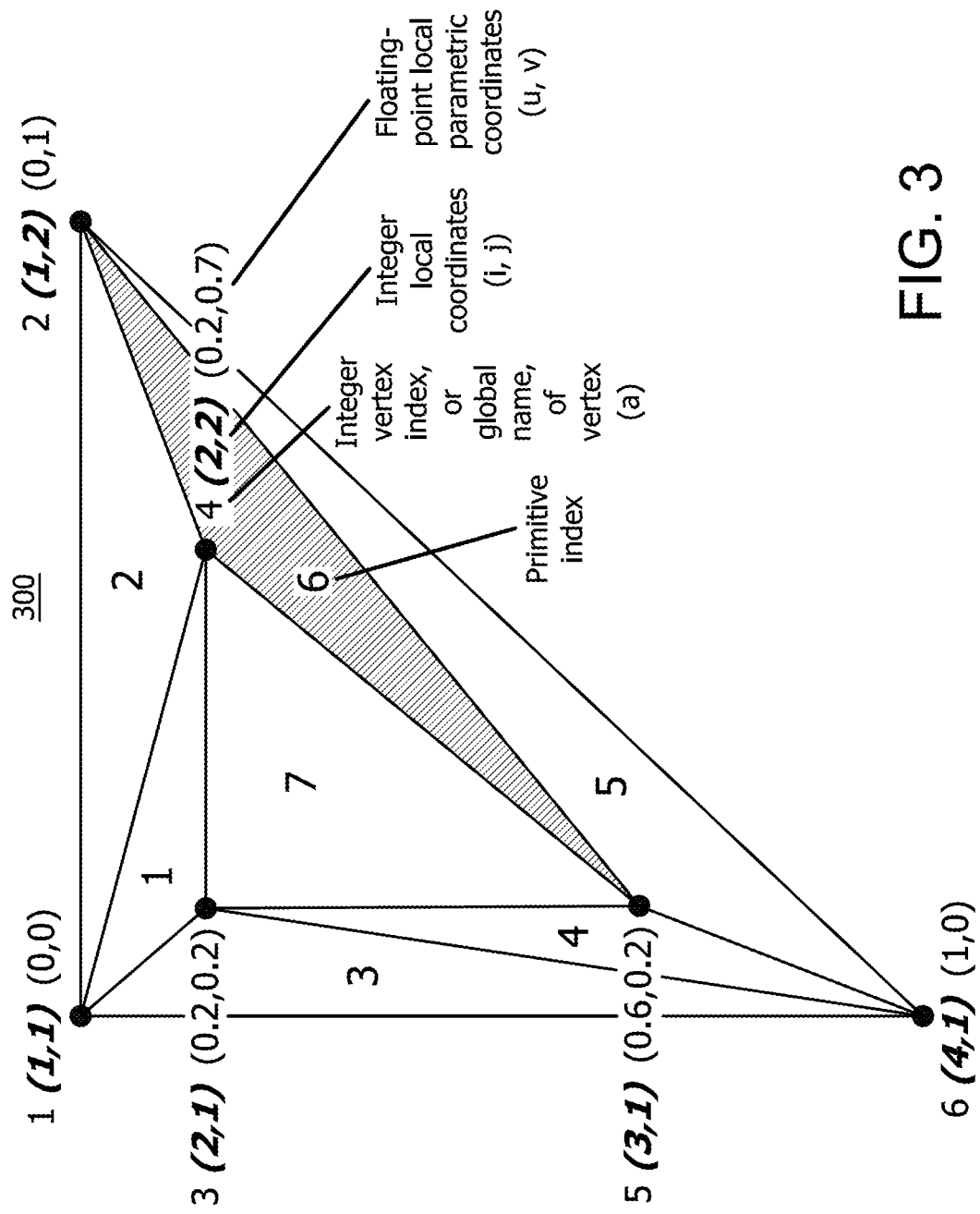
FIG. 3 shows an example of a tessellated triangle patch.

FIG. 3 shows an example, not to be considered limiting, of a tessellated triangle surface patch 300 with six vertices and seven triangular primitives. The seven primitives are labeled with primitive indices 1 through 7, with primitive 6 shaded gray for illustrative purposes. At each vertex, three sets of numbers associated with that vertex are shown: an integer vertex index (referred to as a vertex index hereinafter), a set of integer coordinates, and a set of parametric floating-point coordinates (referred to as parametric coordinates hereinafter). To illustrate, the shaded primitive 6 includes vertices defined by integer vertex indices 4, 2, and 5. Such a set of vertex indices is referred to in general as $(a_1, a_2, a_3)_n$ for an n-th primitive hereinafter. Each vertex index may be referred to as a global name of its vertex which may be used to access vertex related data. There may be alternative methods for naming vertices. For example, patch subdivision mesh with vertices in the nodes also may define each vertex in a different but local manner using indices of a row and a column as integer coordinates for each primitive vertex of a patch subdivision mesh.

Continuing with the example, vertex 4 has integer local coordinates (2, 2). Such integer local coordinates are referred to in general as (i, j) hereinafter. Vertex 4 also has parametric local coordinates (0.2, 0.7). These parametric coordinates are referred to in general as (u,v) hereinafter. Parametric coordinates (u, v) define an exact position of a vertex in an internal patch parametric space. These coordinates can be used later for calculation of subdivision vertex geometry coordinates in 3D view space, which are referred to in general as (x, y, z, w) hereinafter. Other vertices in FIG. 3 are labeled similarly to vertex 4.

Figure 4:
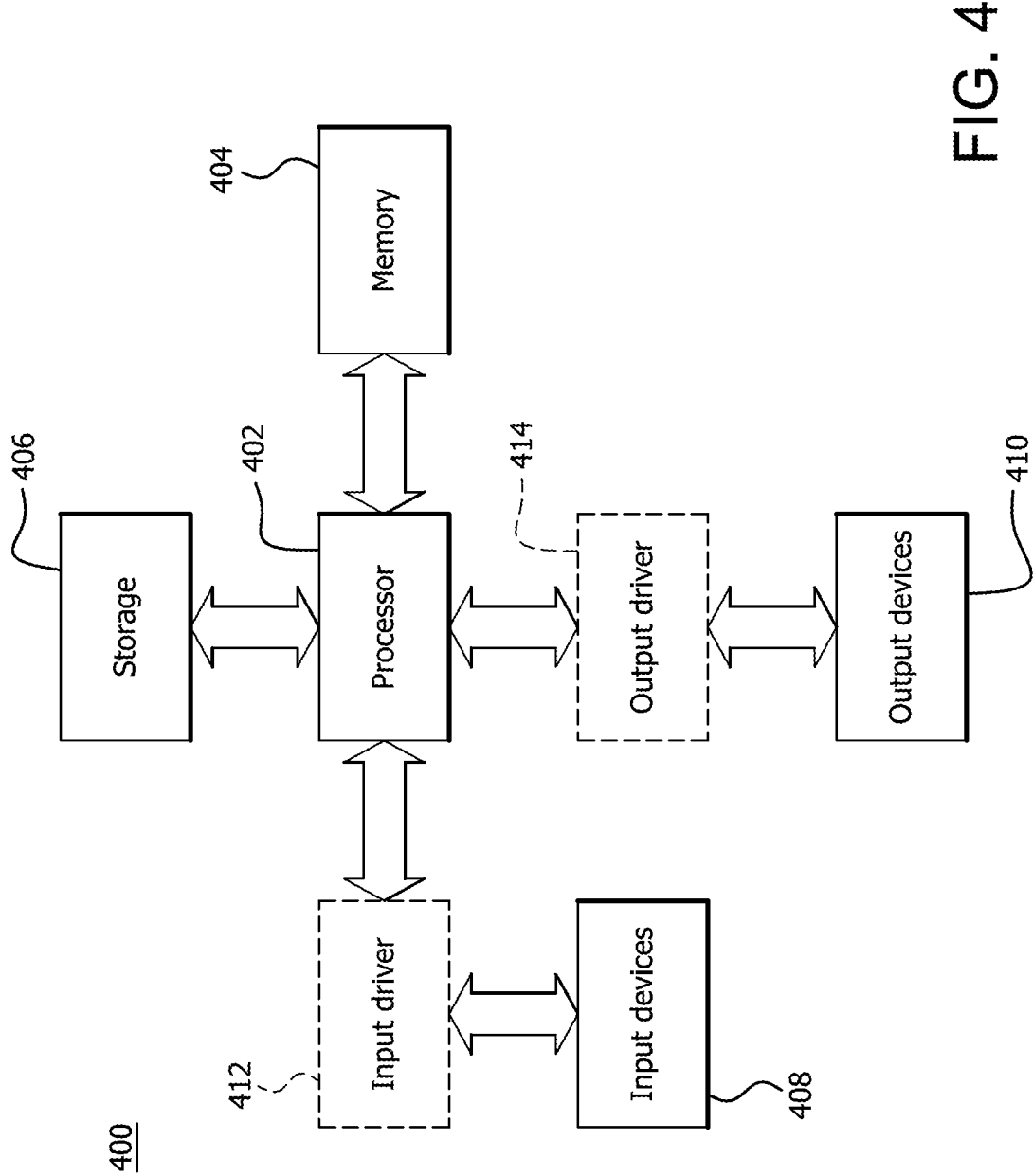
FIG. 4 shows a block diagram of an example device in which one or more disclosed embodiments may be implemented.

FIG. 4 is a block diagram of an example device 400 in which one or more disclosed embodiments may be implemented. The device 400 may include a computer, for example, a desktop computer, a tablet computer, a gaming device, a handheld device, a set-top box, a television, or a mobile phone. The device 400 includes a processor 402, a memory 404, a storage 406, one or more input devices 408, and one or more output devices 410. The device 400 may also optionally include an input driver 412 and an output driver 414. It is understood that the device 400 may include additional components not shown in FIG. 4.

The processor 402 may include a central processing unit (CPU), a graphics processing unit (GPU), a CPU and GPU located on the same die, or one or more processor cores, wherein each processor core may be a CPU or a GPU. The memory 404 may be located on the same die as the processor 402, or may be located separately from the processor 402. The memory 404 may include a volatile or non-volatile memory, for example, random access memory (RAM), dynamic RAM, or a cache.

The storage 406 may include a fixed or removable storage, for example, a hard disk drive, a solid state drive, an optical disk, or a flash drive. The input devices 408 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 410 may include a display, a speaker, a printer, a haptic feedback device, one or more lights, an antenna, or a network connection (e.g., a wireless local area network card for transmission and/or reception of wireless IEEE 802 signals).

The input driver 412 communicates with the processor 402 and the input devices 408, and permits the processor 402 to receive input from the input devices 408. The output driver 414 communicates with the processor 402 and the output devices 410, and permits the processor 402 to send output to the output devices 410. It is noted that the input driver 412 and the output driver 414 are optional components, and that the device 400 will operate in the same manner if the input driver 412 and the output driver 414 are not present. Although described embodiments include a main display, the invention may be practiced without a main display, and only include a source device of video. In this way, the control territory may be an office environment with a plurality of portable devices and no main display.

Figure 5A:
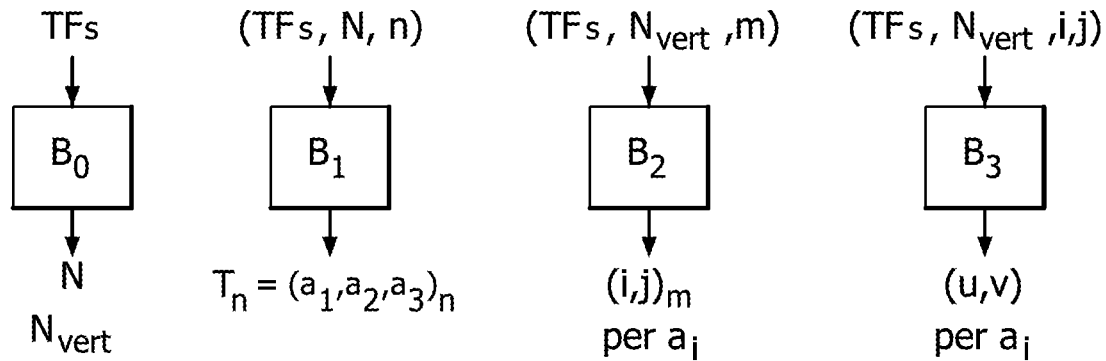
FIGS. 5a and 5b show a method of performing tessellation according to an embodiment.
Figure 5B:
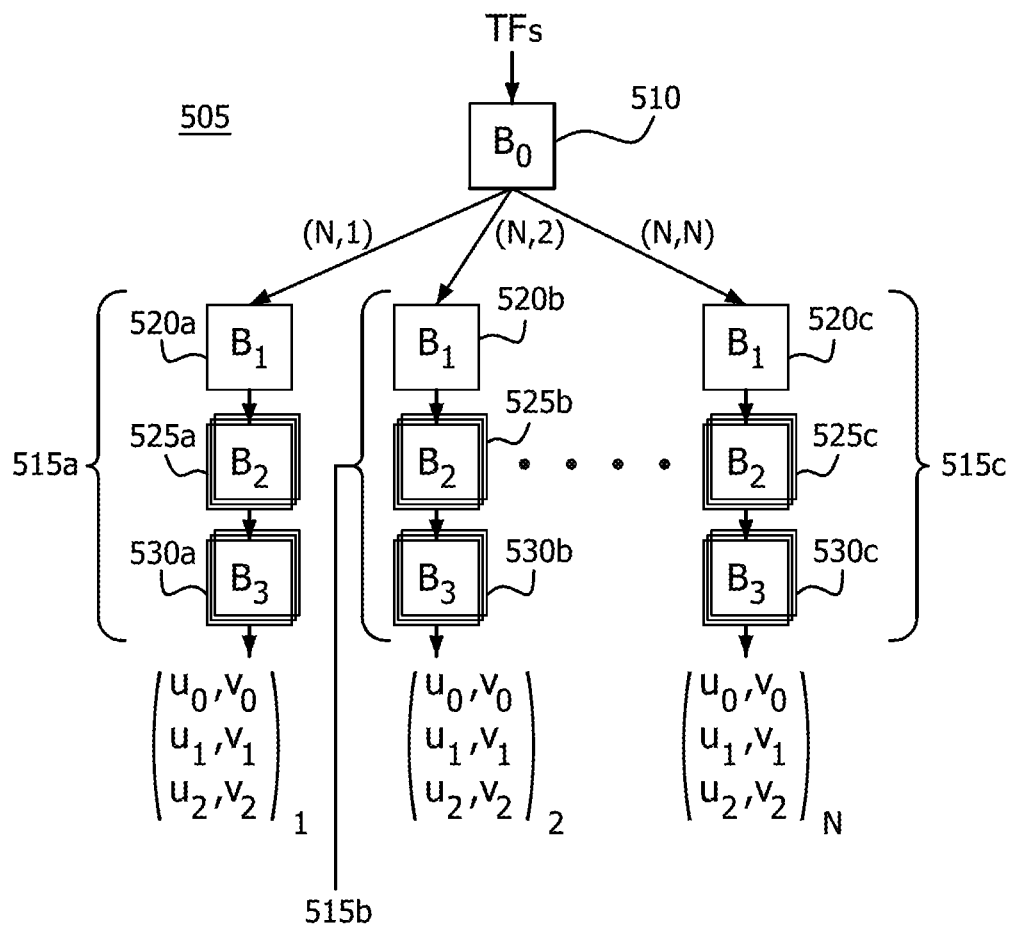

FIGS. 5a and 5b show a method of performing tessellation according to an embodiment. Four basic functional blocks $B_0$, $B_1$, $B_2$, $B_3$, of the method are presented in FIG. 5a. The number of functional blocks, their functions, and their implementation, are not necessarily to be construed as limiting. In embodiments, blocks $B_0$-$B_3$ themselves may be implemented differently. As examples, $B_0$ may be a software program, $B_1$ may be a fixed function hardware block and $B_2$-$B_3$ may be implemented based on programmable hardware, programmed using code such as a shader kernel. Furthermore, different instances of the same functional block can also have different implementations. For example, some $B_1$ blocks may remain fixed function hardware blocks, but other $B_1$ blocks may run a shader kernel. In any embodiment using sequences of functional blocks, such as that shown in FIGS. 5a and 5b, each functional block may be implemented as hardware, as software, as firmware, as a shader code, or as any combination of hardware, software, firmware, or shader code.

In the embodiment of FIG. 5a-5b, block $B_0$ takes tessellation factors (TFs) as an input and returns a total number of vertices needed $N_{vert}$. This number is a measure of an amount of work needed to tessellate a current patch. Block $B_0$ also returns a total number of primitives needed N. Block $B_1$ takes TFs, a total number of primitives N, and a primitive index n of a primitive and generates an nth primitive as a set of vertex indices, such as $(a_1, a_2, a_3)_n$ in a case of an nth triangular primitive, or $(a_1, a_2, a_3, a_4)_n$ in a case of an n-th quadrilateral primitive. This set of indices defines connectivity of vertices in order to define primitive n. Block $B_2$ takes TFs, total number of vertices $N_{vert}$, and a vertex index m to generate integer coordinates $(i, j)_m$ of the vertex m. Block $B_3$ takes TFs, number of vertices $N_{vert}$ and vertex integer coordinates (i, j) to produce parametric coordinates (u, v) in patch subdivision space. The meaning of the local integer and parametric coordinates, vertex indices, and primitive indices is explained in FIG. 3, described hereinbefore.

FIG. 5b shows an embodiment of a tessellator 505, not to be considered limiting, built using a plurality of the functional blocks $B_0$, $B_1$, $B_2$, and $B_3$. In this embodiment, these previously described four functional blocks are shown, but the number of blocks and the function performed by each block, to be described in what follows, are not to be construed as limiting. In FIG. 5b, N is a total number of primitives. In the embodiment shown in FIG. 5b, vertex coordinates and parametric coordinates for N primitives are determined in parallel.

Tessellator 505 includes a $B_0$ block 510 and a number of parallel processing sequences 515a, 515b, 515c, each sequence including blocks $B_1$, $B_2$, and $B_3$. Each of the sequences 515a, 515b, 515c determines, in parallel with the other sequences, parametric coordinates for all vertices in a primitive, up to the N-th primitive in subdivision mesh geometry. There are a total of N sequences, one for each primitive in the subdivision mesh geometry, but for clarity only three sequences 515a, 515b, and 515c are shown in detail in FIG. 5b and described in what follows. A single $B_0$ block 510 generates a number of primitives N and a total number of vertices and provides that information to each $B_1$ block 520a, 520b, 520c at the start of each sequence. Each of the N instances of block $B_1$ receives a corresponding vertex index (consecutive integers from 1 to n inclusive) and produces a set of vertex indices or global vertex names for that vertex, as described hereinbefore. This set is forwarded to each of n instances of $B_2$ blocks, 525a, 525b, 525c, to produce local integer coordinates for each vertex based on row (horizontal strips) and column (vertical strips) enumeration of subdivision mesh geometry. It may be also considered as two dimensional indexing similar to indexing of 2D arrays. In the example of FIG. 5b, each sequence is shown having three $B_2$ blocks, each producing a pair of integer local coordinates (i, j), but this is not to be regarded as limiting. The integer coordinates are forwarded to $B_3$ blocks, 530a, 530b, 530c, each of which produces therefrom a pair of parametric coordinates (u, v). In the example of FIG. 5b, each sequence is shown having three $B_3$ blocks, each producing a pair of parametric coordinates (u,v), but this is not to be regarded as limiting. The end result is that each sequence produces, in parallel with the other N–1 sequences, a set of parametric coordinates $(u_0, v_0; u_1, v_1; u_2, v_2)_k$ for the k-th primitive out of a total of N primitives. In this particular example, each primitive of subdivision mesh geometry has three vertices, each vertex having a pair of parametric coordinates (u, v); but this is not to be considered limiting.

This implementation is a fully parallel one, because tessellator 505 is free of any dependencies between the blocks and sequences, dependencies that may arise in an iterative implementation such as that described hereinbefore. In this implementation, local parametric coordinates (u, v) and vertex connectivity may be found analytically and in arbitrary order, and consequently, an iterative tessellation scheme may be avoided. Other embodiments of parallel tessellation using blocks such as $B_0$, $B_1$, $B_2$, and $B_3$ may be constructed. Other embodiments may include, for example, parallel computation of vertices as well as primitives. Partially parallel implementations that do a portion of work simultaneously are possible as well.

Figure 6:
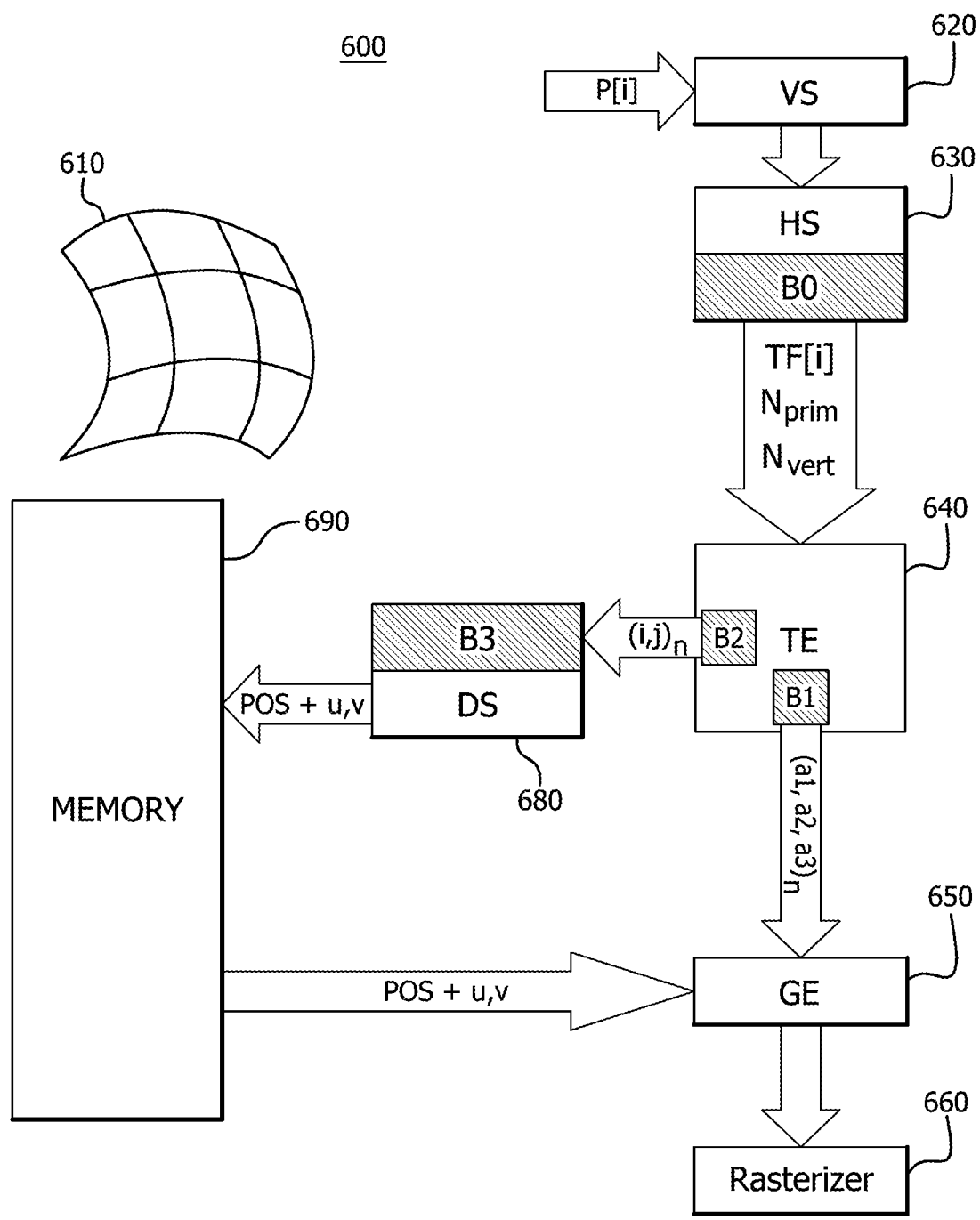
FIG. 6 shows a block diagram of a tessellation flow according to an embodiment.

FIG. 6 is an example block diagram of a tessellation flow 600 according to an embodiment. As one example of the action of tessellation flow 600, a quadrilateral surface patch 610 is shown tessellated into quadrilateral primitives. In the tessellation flow 600, vertex shader 620 prepares patch control points for the next stage.

Programmable (e.g. Hull) shader or other computing device HS 630 determines patch tessellation factors TF[i], where i goes from, for example, 1 to 4 or 6 depending on the patch type. It also determines the total number of primitives and vertices, implementing the functionality of the block $B_0$. Programmable shader 630 may utilize variable subdivision rates when generating the tessellation factors.

Tessellation engine 640 implements the functionality of blocks $B_1$ and $B_2$. The tessellation engine could be implemented as a hardware block, shader or CPU firmware, or using any other means of computation. According to the flow presented in FIG. 5b, the tessellation engine sends a stream of primitives in the form of an index list $(a_1, a_2, a_3)_n$ to geometry engine 650, as well as a stream of indices in the form of integer local coordinates (i,j) to DS 680. An example of patch with indices, integer and parametric coordinates is shown in FIG. 3 and explained hereinbefore.

Figure 7:
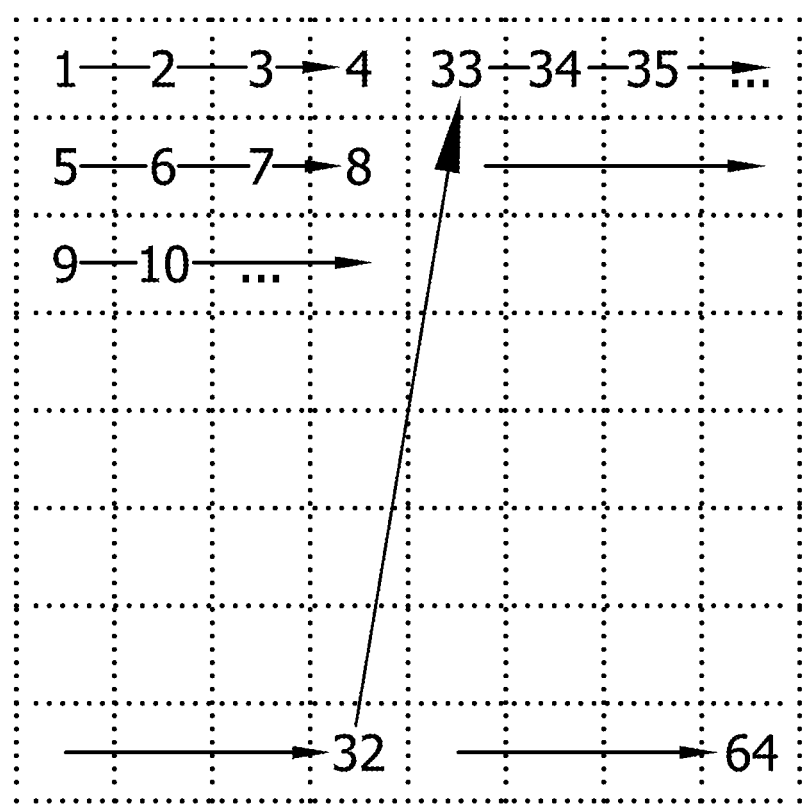
FIG. 7 shows an example of a scan path on a patch subdivision mesh.

The order of the stream of the vertices and the primitives that are sent by tessellation engine 640 may be implemented as patch subdivision mesh scan strips parameterized by the capacity of the communication channels between the blocks. For example, the width of the strip may be determined by the size of reuse buffers. An example zigzag scan path on patch subdivision mesh is shown in FIG. 7, where the arrows represent the direction of the scan and numbers show the order of the primitives.

Programmable (domain) shader or other computing device DS 680 implements the last piece of the flow presented in the FIG. 5B, block B3, that converts the integer local coordinates (i, j) to the parametric coordinates (u, v). These coordinates are then translated into 3D view geometry coordinates (x, y, z, w) and stored into memory 690 along with the (u, v)'s and index (name) of the vertex $a_n$.

Finally, using connectivity information from tessellation engine 640 and the coordinates (u, v, x, y, z, w) of the indices from memory 690, geometry engine 650 sends primitives in the form of a list of coordinates to rasterizer 660.

It should be understood that many variations are possible based on the disclosure herein. Although features and elements are described above in particular combinations, each feature or element may be used alone without the other features and elements or in various combinations with or without other features and elements.

For example, a method such as that shown in FIGS. 5*a*-5*b* may be performed by software alone, hardware alone, firmware alone, a combination of software and hardware, a combination of software and firmware, a combination of hardware and firmware, or a combination of software and hardware and firmware. As an example, the indices, or names, $(a_1, a_2, a_3)_n$ may be utilized in software to return previously calculated vertices which may be sent, along with triangles, to the rasterizer stages. Additionally, multiple parallel rasterizers may be utilized, which may reduce latency and increase performance or throughput.

The tessellation flow described in FIG. 5*a* isn't the only possible one. For example, the blocks B2 and B3 can be combined into a single unit, or the block B0 can be incorporated into the rest of the blocks B1-B3. Another variation includes caching and/or storing the outputs of all or some of the blocks into a table for reuse. Also, merging several instances of any of the blocks is also possible, so that multiple primitives and/or vertices are produced in a single call. Any block may as well be substituted by an analogous one, depending on the tessellation and input/output requirements. For example, block B3 may produce fixed point coordinates instead of the floating-point ones. Finally, multiple tessellation flows can be in use at the same time. For example large patches may be tessellated utilizing a cache-enabled flow, while small ones may go through the direct B0-B1-B2-B3 path.

Tessellation flow doesn't depend on the implementation of the blocks B0-B3, as that implementation may also be varied. For example, all blocks can be implemented as fixed function hardware units, firmware code, shader code, FPGA and similar devices, or any combination thereof. Moreover, the same block may have multiple implementations in the same device. For example, block B1 may be implemented as a fixed function hardware unit and as a shader code, and depending on the availability of the resources (such as GPU cores) the tessellation flow can be switched from hardware to the shader execution.

Finally, any combination of the tessellation flows and block implementations are also possible, including multiple flows and block implementations in the same device at the same time. For example, depending on the patch size and resource availability, the flow may be either a fixed function hardware unit with a single primitive per clock output or a shader only massively parallel tessellator.

Embodiments of the method described herein may be configured to be fully compliant with existing tessellators and tessellation methods regarded as industry standards.

The methods provided may be implemented in a general purpose computer, a processor, or a processor core. Suitable processors include, by way of example, a general purpose processor, a special purpose processor, a conventional processor, a GPU shader processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing high-speed tessellation, comprising:
   determining, from tessellation factors, a number of vertices and a number of primitives for tessellation of a three-dimensional surface patch;
   providing at least the number of vertices and the number of primitives to a plurality of sequences of functional blocks;
   generating, for the three-dimensional surface patch, each of the number of primitives in parallel, wherein each primitive in the number of primitives is generated by an associated sequence of functional blocks from the plurality of sequences of functional blocks, and each primitive in the number of primitives is determined in an arbitrary order; and
   rendering an image based on the number of primitives.

2. The method of claim 1, wherein the tessellation factors are generated by a programmable shader.

3. The method of claim 2, wherein the programmable shader utilizes variable subdivision rates when generating the tessellation factors.

4. The method of claim 1, wherein the generating, for the n-dimensional surface patch, further comprises:
   determining, in each sequence, vertex connectivity defining the primitive, using the tessellation factors and the number of primitives;
   determining, in each sequence, integer coordinates for a vertex, using the tessellation factors and the number of vertices; and
   determining, in each sequence, floating-point coordinates for the vertex using the integer coordinates.

5. The method of claim 4 wherein the determining of integer coordinates, the determining of floating-point coordinates, and the determining of vertex connectivity are done analytically and in arbitrary order, thereby avoiding iterative tessellation schemes.

6. The method of claim 1, further comprising determining mesh geometry of the surface patch.

7. A system for performing high-speed tessellation, comprising:
   a first functional block configured to determine a number of vertices needed and a number of primitives needed for tessellation of a three-dimensional surface patch, using tessellation factors;
   a plurality of sequences of functional blocks configured to receive at least the number of vertices and the number of primitives and generate each of the number of primitives, for the three-dimensional surface patch, in parallel, wherein each primitive in the number of primitives is generated by an associated sequence of functional blocks from the plurality of sequences of functional blocks, and each primitive in the number of primitives is determined in an arbitrary order; and a circuit configured to render an image based on the number of primitives.

8. The system of claim 7, further comprising circuitry configured to rasterize the patch using the number of primitives generated in parallel.

9. The system of claim 7, wherein each sequence comprises functional blocks, the functional blocks comprising:

a second functional block configured to determine vertex connectivity defining a primitive in the number of primitives, using the tessellation factors and the number of primitives;

a third functional block configured to determine integer local coordinates for a vertex, using the tessellation factors and the number of vertices; and a fourth functional block configured to determine parametric floating-point coordinates for the vertex using the integer local coordinates.

10. The system of claim 9, wherein the third functional block is configured to determine subdivision mesh geometry of the surface patch.

11. The system of claim 7, further comprising a programmable shader configured to determine the tessellation factors.

12. The system of claim 11, wherein the programmable shader is configured to utilize variable subdivision rates when calculating the tessellation factors.

13. The system of claim 7, wherein each functional block is implemented as hardware, as software, as firmware, as a shader code, or as any combination of hardware, software, firmware, or shader code.

14. A method for performing high-speed tessellation, comprising:

determining, from tessellation factors, a number of vertices and a number of primitives for tessellation of a three-dimensional surface patch;

providing at least the number of vertices and the number of primitives to a plurality of sequences of functional blocks;

generating, for the three-dimensional surface patch, each of the number of primitives on a partial parallel basis, wherein each primitive in the number of primitives is generated by an associated sequence of functional blocks from the plurality of sequences of functional blocks, a portion of each of the associated sequence of functional blocks acting independent of others of the plurality of sequences of functional blocks; and rendering an image based on the number of primitives.

15. The method of claim 14, wherein the tessellation factors are generated by a programmable shader.

16. The method of claim 15, wherein the programmable shader utilizes variable subdivision rates when generating the tessellation factors.

17. The method of claim 14, wherein the generating, for the n-dimensional surface patch, further comprises:

determining, in each sequence, vertex connectivity defining the primitive, using the tessellation factors and the number of primitives;

determining, in each sequence, integer coordinates for a vertex, using the tessellation factors and the number of vertices; and determining, in each sequence, floating-point coordinates for the vertex using the integer coordinates.

18. The method of claim 17, wherein the determining of integer coordinates, the determining of floating-point coordinates, and the determining of vertex connectivity are done analytically and in arbitrary order, thereby avoiding iterative tessellation schemes.

19. The method of claim 14, further comprising determining mesh geometry of the surface patch.

20. The method of claim 14, wherein each primitive in the number of primitives is determined in an arbitrary order.

* * * * *